UNITED STATES PATENT OFFICE.

JAMES P. PERKINS, OF PULLMAN, ILLINOIS.

MANUFACTURE OF PAINT FROM RECALCINED SILICATE IRON SLAG.

SPECIFICATION forming part of Letters Patent No. 363,673, dated May 24, 1887.

Application filed March 18, 1886. Serial No. 195,706. (No specimens.)

*To all whom it may concern:*

Be it known that I, JAMES P. PERKINS, of Pullman, in the county of Cook and State of Illinois, have invented a certain new and useful Improved Paint and Process of Making the Same; and I do hereby declare that the following is a full, clear, and exact description thereof.

This invention relates to an improvement in the paint-base and paint described in Letters Patent of the United States No. 318,791, granted to me on May 26, 1885. In said Letters Patent a paint is described having a base consisting of pulverulent silicate iron slag.

The present invention contemplates the reduction of the iron slag either to a powder or to a granular form, then roasting or calcining it, (or rather recalcining it, as it is calcined in the process of slagging,) and thereafter mixing it with oil or other vehicle by grinding or otherwise to form a paint. The pulverulent dry recalcined product is new as a paint-base, and a paint consisting of such a base and a suitable vehicle, with or without coloring agents, is also new. The distinctive advantages of the base and paint above specified will be hereinafter pointed out.

A paint-base prepared by pulverizing the silicate slag obtained from iron-furnaces in the manner set forth in the said prior patent, when unmixed with other materials, forms a paint of a grayish color suitable for many purposes and capable, by the addition of suitable coloring pigments, to be made into paint of other color. The admixture of other substances to give color to the paint is obviously undesirable, however, both on account of the additional cost involved and the fact that by adding substances which are less enduring than the silicate slag paint-base the lasting qualities of the paint are impaired.

I have discovered that by exposing pulverized silicate slag to a high degree of heat, or, in other words, by roasting or calcining it, the pulverized material will become permanently changed in color, so that a paint differing in color from that made from the pulverized slag, as described in the above-mentioned patent, may be obtained without the addition of any coloring-pigment. The colors produced in the pulverized slag by calcining or roasting, as above set forth, are found to vary according to the conditions under which the calcining is accomplished. The colors produced are, however, in most cases desirable ones, useful for most purposes for which colored paint is employed, and the colors may be produced in considerable variety by variations in the details of the operation of roasting or calcining.

I have found, for instance, that if pulverized silicate slag be placed in an open crucible and heated in a furnace in which it is not exposed to the products of combustion to a temperature of from 1,500° to 2,500° Fahrenheit the color of the pulverized material will be changed to a desirable red. I have also found that by calcining the pulverized material in a closed but not air-tight crucible or retort deeper or darker shades will be produced—as, for instance, brownish purple or seal-brown—the exact color depending, as far as I have been able to ascertain, upon the amount of air admitted to the material while it is exposed to the heat, the degree of heat, and, to some extent, perhaps, the kind of fuel used.

In preparing the silicate slag for calcining for the purpose of producing a colored paint-base, as above set forth, the silicate slag is preferably obtained from the iron slag from blast, puddling, or reheating furnaces by selecting the parts of the slag in which oxide of iron and silicon or silicate of iron are present with a comparatively slight admixture of foreign substances or in a practically pure state, the parts of the slag and the silicate of iron being distinguished as being the heaviest or more dense or compact part of the mass, and as being black, or nearly so, in color, and also as having a vitreous fracture, these parts usually being found adjacent to the outer surface of the cooled blocks or cakes taken from the molds or pits into which the slag is run from the furnaces. In the case of the slag from puddling or reheating furnaces, the relative quantity of oxide of iron in the slag is larger, so that the selection of proper material will be attended with little difficulty. The solidified silicate slag thus obtained is reduced by crushing or grinding either to a powder or to a granular condition corresponding with fine gunpowder, or even coarser, and is then calcined or roasted by subjecting it to extreme heat in a furnace, as above described. After the calcining has been accomplished, the pulverized material, if finely powdered before calcining, will be mixed with oil and ground, if necessary, for its further reduction and to thoroughly incorporate the ingredients; or, if the pulverized material is calcined in a coarse or granular condition it is preferably mixed with the oil, and the two ingredients then ground together until the granular character of the base disappears or until it is fine enough for the particular purposes to which the paint is to be applied.

The degree of heat applied to the pulverized material in calcining or roasting it is not sufficient to melt the latter. Favorable results have been obtained by heating the pulverized material to the verge of melting or to a bright-red heat.

The silicate slag paint-base colored by the second calcining in the manner above described has the advantage of being lighter in weight than the base referred to in the former patent, and therefore less liable than the latter to separate from the oil in which it is ground and to settle in the bottom of the vessel containing it. Such base after being recalcined has the advantage also of grinding in oil much finer and more easily than the original slag.

A paint made from silicate slag colored by recalcination in the manner above described is found to be much more opaque than that made from slag not recalcined, either when the latter is used by itself or with other coloring pigments, the obvious advantage of such opacity being that it "covers" better, and therefore produces the same solidity or depth of color with the use of a less quantity or fewer coats of the paint. This recalcined slag-paint described has finally the advantages of great durability and of being cheaply produced from a product which is otherwise of little or no value.

It is of course understood that, in the paint made from the base above described, other liquids may be employed with the oil for drying and other purposes, or in place of oil as a vehicle, and that coloring substances may be added to produce a desired variation from the natural shade of the base.

I am aware that ochers and other substances used as paint bases or pigments have been calcined for the purpose of changing their color; and I therefore do not claim such operation as broadly new in the preparation of paint bases or pigments.

I claim as my invention—

1. As a new product suitable for a paint-base, silicate iron slag in granular or pulverulent form and recalcined.

2. As an improved paint, recalcined silicate iron slag mixed with oil or other suitable vehicle.

3. The process of making paint from silicate iron slag and a vehicle, which consists in first reducing the slag to a granular or pulverulent form, then calcining it, and finally mixing it with the vehicle, substantially as described.

In testimony that I claim the foregoing as my invention I affix my signature in presence of two witnesses.

JAMES P. PERKINS.

Witnesses:
C. CLARENCE POOLE,
M. E. DAYTON.